United States Patent
Huang

(10) Patent No.: US 10,107,917 B2
(45) Date of Patent: Oct. 23, 2018

(54) METHOD OF INTER-CHANNEL BIAS CALIBRATION IN A GNSS RECEIVER AND RELATED DEVICE

(75) Inventor: Sheng-Yu Huang, Taichung (TW)

(73) Assignee: MediaTek Inc., Hsin-Chu (TW)

( * ) Notice: Subject to any disclaimer, the term of this patent is extended or adjusted under 35 U.S.C. 154(b) by 1199 days.

(21) Appl. No.: 13/542,671

(22) Filed: Jul. 6, 2012

(65) Prior Publication Data

US 2013/0141280 A1   Jun. 6, 2013

Related U.S. Application Data

(60) Provisional application No. 61/566,980, filed on Dec. 5, 2011.

(51) Int. Cl.
*G01S 19/23* (2010.01)
*G01S 19/36* (2010.01)

(52) U.S. Cl.
CPC ............ *G01S 19/23* (2013.01); *G01S 19/235* (2013.01); *G01S 19/36* (2013.01)

(58) Field of Classification Search
CPC ......... G01S 19/36; G01S 19/235; G01S 19/23
USPC ........................................ 342/357.62, 357.76
See application file for complete search history.

(56) References Cited

U.S. PATENT DOCUMENTS

| | | | |
|---|---|---|---|
| 5,914,685 A * | 6/1999 | Kozlov | G01S 19/44 342/357.26 |
| 5,949,372 A * | 9/1999 | Lennen | G01S 19/23 342/357.62 |
| 6,266,007 B1 * | 7/2001 | Lennen | G01S 19/235 342/174 |
| 6,363,123 B1 | 3/2002 | Balodis | |
| 6,608,998 B1 * | 8/2003 | Neumann | G01S 19/23 455/12.1 |
| 7,221,313 B2 * | 5/2007 | Ganguly | G01S 19/32 342/174 |
| 7,859,454 B2 * | 12/2010 | Abraham | G01S 19/33 342/357.62 |

(Continued)

FOREIGN PATENT DOCUMENTS

| | | |
|---|---|---|
| CN | 1726405 A | 1/2006 |
| CN | 1930789 A | 3/2007 |

(Continued)

OTHER PUBLICATIONS

"Absolute Calibration of Dual Frequency Timing Receivers for Galileo"; Elwischger et al.; Institute for Communications and Navigation, German Aerospace Center (DLR); European Navigation Conference (ENC), Vienna Apr. 2013.*

(Continued)

*Primary Examiner* — Chuong P Nguyen
(74) *Attorney, Agent, or Firm* — Wolf, Greenfield & Sacks, P.C.

(57) ABSTRACT

A method of inter-channel bias (ICB) calibration in a global navigation satellite system (GNSS) receiver, the method comprises receiving a plurality of GNSS radio-frequency (RF) signals, converting the plurality of GNSS RF signals into a plurality of GNSS baseband signals utilizing an RF front-end processing unit, generating a measurement result according to the plurality of GNSS baseband signals utilizing a baseband processing unit, and calibrating the measurement result utilizing a plurality of pre-determined inter-channel biases.

28 Claims, 4 Drawing Sheets

(56) References Cited

U.S. PATENT DOCUMENTS

| | | | | |
|---|---|---|---|---|
| 8,018,379 B1* | 9/2011 | Sun | ............... | G01S 19/33 |
| | | | | 342/357.73 |
| 8,022,868 B2 | 9/2011 | Yudanov | | |
| 8,400,354 B2* | 3/2013 | Abraham | ............... | G01S 19/23 |
| | | | | 342/357.46 |
| 8,576,768 B2* | 11/2013 | Zhao | ............... | H04B 1/0007 |
| | | | | 370/316 |
| 8,803,736 B2* | 8/2014 | Dai | ............... | G01S 19/235 |
| | | | | 342/357.27 |
| 9,103,912 B2* | 8/2015 | Yudanov | ............... | G01S 19/23 |
| | | | | 342/357.62 |
| 9,401,769 B2* | 7/2016 | Mayor | ............... | H04B 17/318 |
| 2010/0164798 A1* | 7/2010 | Yudanov | ............... | G01S 19/235 |
| | | | | 342/357.62 |
| 2010/0207813 A1* | 8/2010 | Lo | ............... | H03L 1/026 |
| | | | | 342/357.62 |
| 2010/0245168 A1* | 9/2010 | Rollet | ............... | G01S 19/21 |
| | | | | 342/357.23 |
| 2011/0037652 A1 | 2/2011 | Stafford | | |
| 2011/0050489 A1* | 3/2011 | Maenpa | ............... | G01S 19/23 |
| | | | | 342/357.23 |
| 2011/0080322 A1 | 4/2011 | Abraham | | |

FOREIGN PATENT DOCUMENTS

| | | |
|---|---|---|
| CN | 101770815 A | 7/2010 |
| CN | 101784908 A | 7/2010 |
| CN | 101806900 A | 8/2010 |
| CN | 101382589 B | 7/2011 |
| CN | 102207549 A | 10/2011 |
| CN | 101655547 B | 8/2013 |
| CN | 101810046 B | 10/2013 |
| JP | 11109016 | 4/1999 |

OTHER PUBLICATIONS

"Receiver Inter-Channel Bias Search Technique Based on LAMBDA"; Kim et al.; International Global Navigation Satellite Systems Society; IGNSS Symposium 2013; Outrigger Gold Coast, QLD Australia; Jul. 16-18, 2013.*

* cited by examiner

METHOD OF INTER-CHANNEL BIAS CALIBRATION IN A GNSS RECEIVER AND RELATED DEVICE

CROSS REFERENCE TO RELATED APPLICATIONS

This application claims the benefit of U.S. Provisional Application No. 61/566,980 filed on Dec. 5, 2011, the contents of which are incorporated herein.

BACKGROUND

The present invention relates to a global navigation satellite system (GNSS) receiver, and more particularly, to a method of inter-channel bias (ICB) calibration in a GNSS receiver and related device.

Nowadays several global navigation satellite systems (GNSSs), such as Global Positioning System (GPS) and Global Orbiting Navigation Satellite System (GLONASS), have been developed and designed for commercial use. The navigation satellites of the same or different GNSSs may broadcast radio-frequency (RF) signals for positioning at different frequency bands. For example, the GPS navigation satellites broadcast RF signals at two frequency bands, around 1575.42 MHz (L1 frequency band) and 1227.6 MHz (L2 frequency band) respectively. In addition, the GLONASS navigation satellites broadcast RF signals at different frequency bands from each other. A GNSS receiver which supports multiple GNSSs (e.g. GPS and GLONASS) can receive RF signals from different GNSSs simultaneously. However, because the navigation satellites may broadcast RF signals at different frequencies, after the received RF signals are filtered, group delays relative to the received RF signals of different channels are different. Such different group delays induce frequency-dependent delays. Moreover, the GNSS receiver has an analog-to-digital converter for converting the received RF signals into digital baseband signals, and a digital processing circuit for generating measurement result. Such element and circuit also induce different hardware/software processing delays.

In general, the frequency-dependent delays and hardware/software processing delays can be separated into a common term and a delta term. The common term can be calibrated by a receiver clock bias of the GNSS receiver. The delta term, which is also called inter-channel biases, cannot be calibrated by such receiver clock bias and may degrade position accuracy of the GNSS receiver.

There are several approaches to enhance positioning accuracy for a known GNSS receiver. A first approach is to use GNSS based navigation information to offset group delays, as disclosed in U.S. Pat. No. 6,608,998 B1. However, the first approach needs to receive RF signals from one GNSS system (e.g. GPS/GLONASS) first for calibration. A second approach is to add an additional calibration circuit to generate a reference signal for calibration, as disclosed in U.S. Pat. No. 6,266,007. However, the second approach raises cost of the GNSS receiver. A third approach is to add an additional front-end calibration channel, where received RF signals are band-pass filtered at a signal intermediate frequency for avoiding group delays, so that group delays of other channels of GNSS systems can be calibrated accordingly. However, the third approach also makes cost of the GNSS receiver increased.

SUMMARY

It is therefore a primary objective of the present invention to provide a GNSS receiver that can effectively calibrate inter-channel biases for RF signals from different navigation satellites, and have the characteristics of fast calibration and cost effective.

The present invention discloses a method of inter-channel bias (ICB) calibration in a global navigation satellite system (GNSS) receiver, the method comprises receiving a plurality of GNSS radio-frequency (RF) signals; converting the plurality of GNSS RF signals into a plurality of GNSS baseband signals utilizing an RF front-end processing unit; generating a measurement result according to the plurality of GNSS baseband signals utilizing a baseband processing unit; and calibrating the measurement result utilizing a plurality of pre-determined inter-channel biases utilizing a plurality of pre-determined inter-channel biases.

The present invention further discloses a GNSS receiver which comprises a GNSS antenna, for receiving a plurality of GNSS RF signals; an RF front-end processing unit, coupled to the GNSS antenna, for converting the plurality of GNSS RF signals into a plurality of GNSS baseband signals; a baseband processing unit, coupled to the baseband processing unit, for generating a measurement result according to the plurality of GNSS baseband signals; and an inter-channel bias (ICB) calibration unit, coupled to the baseband processing unit, for calibrating the measurement result utilizing a plurality of pre-determined inter-channel biases. The said GNSS receiver finally calculates a navigation solution utilizing the calibrated measurement results.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ." Also, the term "couple" is intended to mean either an indirect or direct electrical connection. Accordingly, if one device is coupled to another device, that connection may be through a direct electrical connection, or through an indirect electrical connection via other devices and connections.

Figure 1:
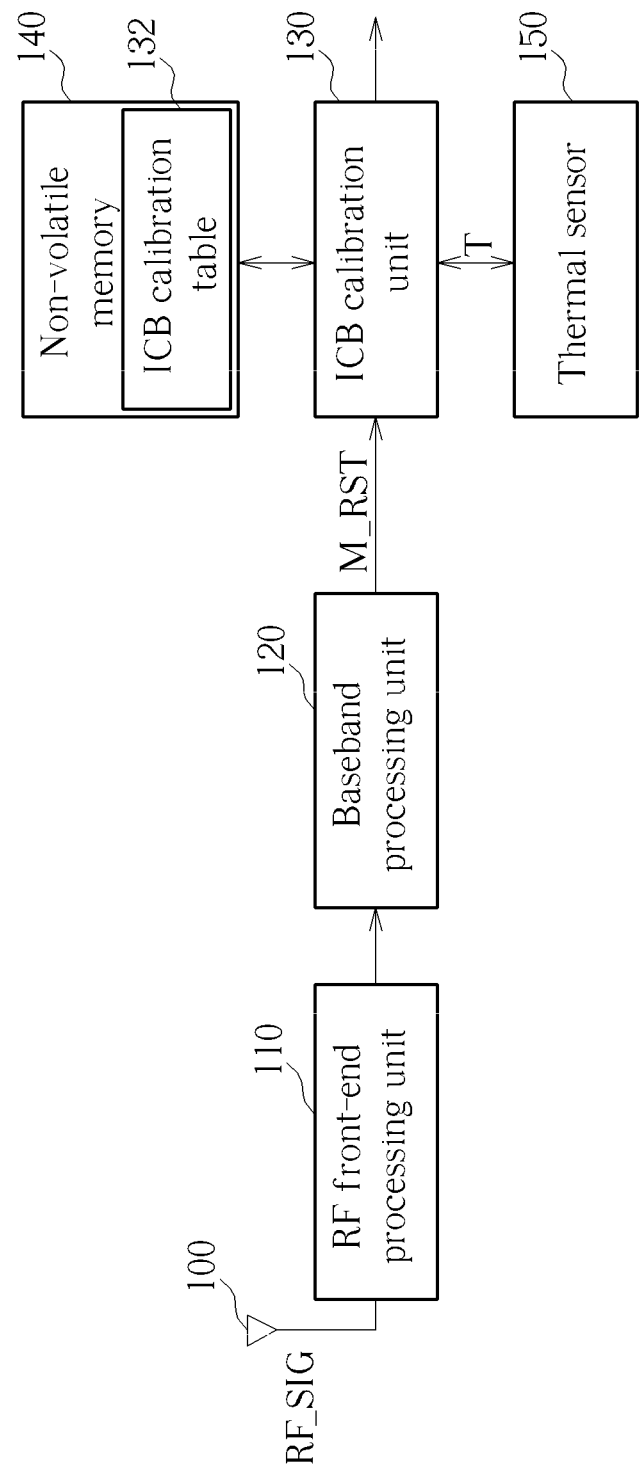
FIG. 1 is a schematic diagram of an exemplary GNSS receiver according to an embodiment of the present invention.

Please refer to FIG. 1, which is a schematic diagram of a global navigation satellite system (GNSS) receiver 10 according to an embodiment of the present invention. The GNSS receiver includes a GNSS antenna 100, a radio-frequency (RF) front-end processing unit 110, a baseband processing unit 120, an inter-channel bias (ICB) calibration unit 130, a non-volatile memory 140 and a thermal sensor 150. The GNSS antenna 100 is capable of receiving GNSS RF signals RF_SIG, e.g. GPS, GLONASS, European satellite navigation system (GALILEO) or Beidou navigation satellite system (COMPASS) signals. The RF front-end processing unit 110, which is coupled to the GNSS antenna 110, is utilized for converting the GNSS RF signal RF_SIG received from the GNSS antenna 100 into GNSS baseband signals. The baseband processing unit 120, which is coupled to the RF front-end processing unit 110, is utilized for generating a measurement result M_RST from the GNSS baseband signals. The ICB calibration unit 130, which is coupled to the baseband processing unit 120, is utilized for calibrating the measurement result M_RST by a pre-determined ICB calibration table 132 stored in the non-volatile memory 140. The pre-determined ICB calibration table 132 includes pre-determined inter-channel biases with various temperature values, where the pre-determined inter-channel biases are obtained in advance. The thermal sensor 150, which is coupled to the ICB calibration unit 130, is utilized for detecting temperature around the GNSS receiver 10, and transmitting a temperature value T according to the detecting result to the ICB calibration unit 130.

Figure 2:
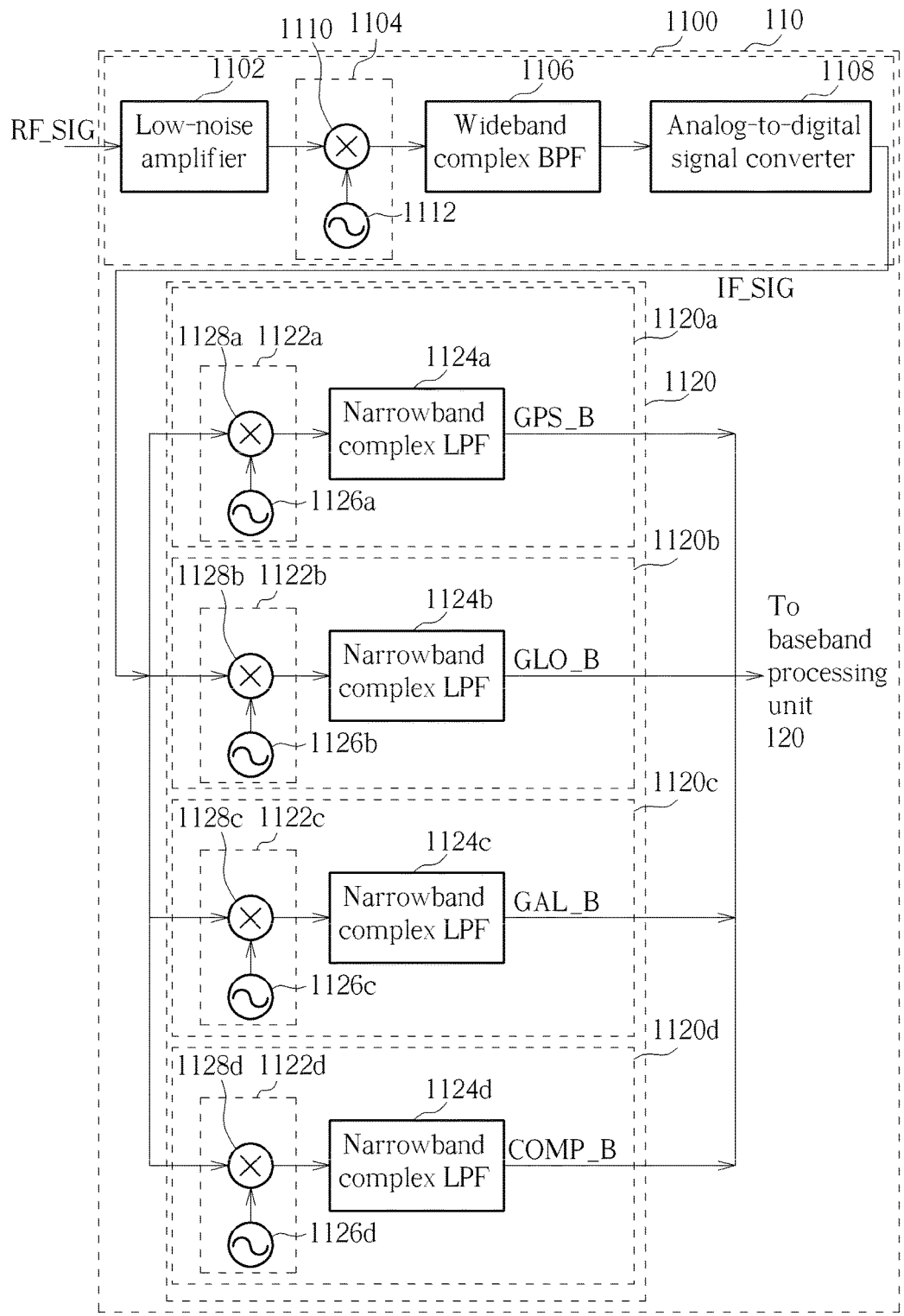
FIG. 2 is a schematic diagram of the RF front-end processing unit shown in FIG. 1.

Please continue to refer to FIG. 2, which is a schematic diagram of details of the RF front-end processing unit 110 shown in FIG. 1. The RF front-end processing unit 110 includes an analog front-end circuit 1100 and a digital front-end circuit 1120. The analog front-end circuit 1100 includes a low-noise amplifier 1102, a first frequency-down converter 1104, a wideband complex band-pass filter 1106 and an analog-to-digital signal converter 1108. The low-noise amplifier 1102 is utilized for amplifying the received GNSS RF signals RF_SIG, which may be very weak after received by the GNSS antenna 100. The first frequency-down converter 1104, which is coupled to the low-noise amplifier 1102, is utilized for converting carrier frequencies of the GNSS RF signals RF_SIG into intermediate frequencies. Specifically, the first frequency-down converter 1104 includes an RF-side oscillator 1112 and a first mixer 1110. The first mixer 1110 combines the amplified GNSS RF signals RF_SIG and the signals generated by the RF-side oscillator 1112 to analog GNSS intermediate frequency (IF) signals. The wideband complex band-pass filter 1106, which is coupled to the first frequency-down converter 1104, is utilized for extracting and passing the analog GNSS IF signals. The bandwidth of the wideband complex band-pass filter 1106 is determined according to the frequency of the signals from the RF-side oscillator 1112 and the frequencies of the GNSS RF signals RF_SIG. The analog-to-digital signal converter 1108, which is coupled to the wideband complex band-pass filter 1106, is utilized for converting the filtered analog GNSS IF signals into digital GNSS IF signals IF_SIG. The digital front-end circuit 1120 includes a GPS digital front-end circuit 1120a, a GLONASS digital front-end circuit 1120b, a GALILEO digital front-end circuit 1120c and a COMPASS digital front-end circuit 1120d, each comprising a second frequency-down converter 1122a/1122b/1122c/1122d and a narrowband complex low-pass filter 1124a/1124b/1124c/1124d. Note that, digital front-end circuits for other GNSS systems or for other channels of the same GNSS system (e.g. channels corresponding to different frequency bands of the GLONASS) may be provided herein. The second frequency-down converter 1122a, which is coupled to the analog-to-digital signal converter 1108, is utilized for converting intermediate frequencies of the digital GNSS IF signals IF_SIG into baseband frequencies. Specifically, the second frequency-down converter 1122a includes a GPS local oscillator 1126a and a GPS baseband mixer 1128a. The GPS baseband mixer 1128a combines the digital GNSS IF signals IF_SIG and the GPS oscillator signals generated by the GPS local oscillator 1126a to GNSS baseband signals GNSS_B_GPS. The narrowband complex low-pass filter 1124a, which is coupled to the second frequency-down converter 1122a, is utilized for extracting and passing GPS components of the GNSS baseband signals GNSS_B_GPS to GPS baseband signals GPS_B. The bandwidth of the narrowband complex low-pass filter 1124a is determined according to the frequency of the signals from the GPS local oscillator 1126a and the frequencies of the digital GNSS IF signals IF_SIG. Similarly, the GLONASS digital front-end circuit 1120b is utilized for converting the digital GNSS IF signals IF_SIG into GLONASS baseband signals GLO_B; the GALILEO digital front-end circuit 1120c is utilized for converting the digital GNSS IF signals IF_SIG into GALILEO baseband signals GAL_B, and the COMPASS digital front-end circuit 1120d is utilized for converting the digital GNSS IF signals IF_SIG into COMPASS baseband signals COMP_B. Then, the baseband processing unit 120, which is shown in FIG. 1, receives the GPS baseband signals GPS_B, the GLONASS baseband signals GLO_B, the GALILEO baseband signals GAL_B and COMPASS baseband signals COMP_B. for generating the measurement result accordingly.

Figure 3:
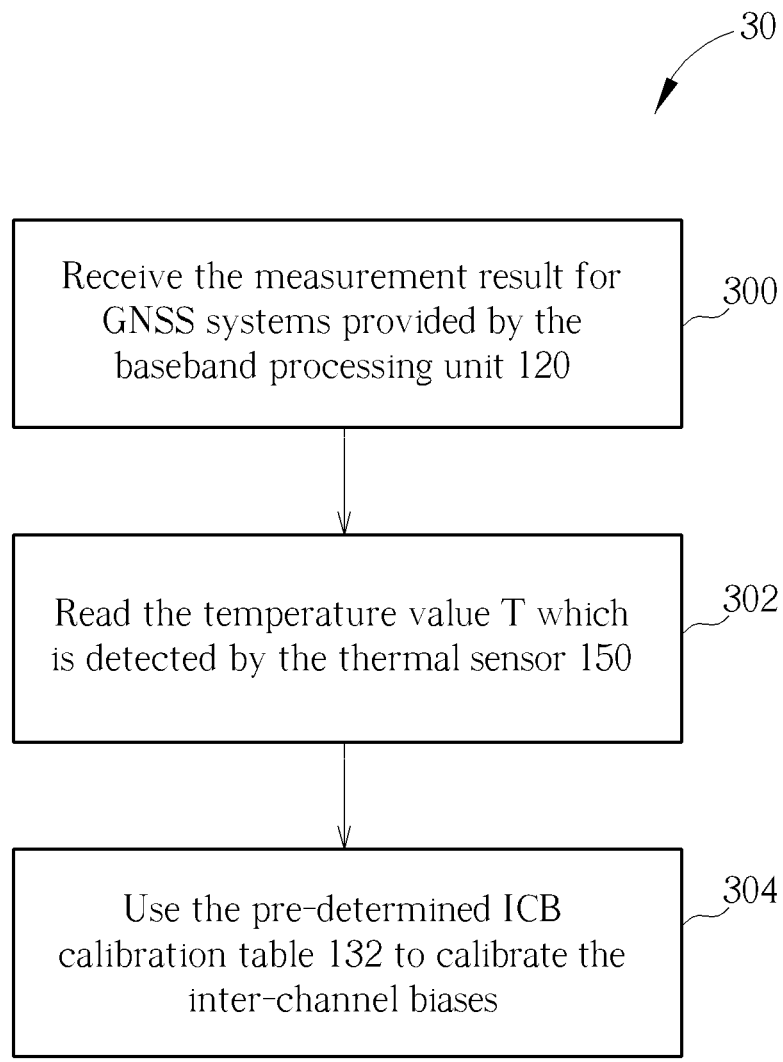
FIG. 3 is a flowchart diagram of an exemplary process for calibrating inter-channel biases according to an embodiment of the present invention.

Inter-channel biases in the GNSS receiver 10 may cause a significant positioning error. Thus, the measurement result needs to be calibrated to reduce positioning error. Please refer to FIG. 3, which is a flowchart diagram of an exemplary process 30 for calibrating inter-channel biases according to an embodiment of the present invention. The process 30 is executed by the ICB calibration unit 130 to calibrate the inter-channel biases existing in the GNSS receiver 10. The process 30 includes, but not limited to, the following steps:

Step 300: Receive the measurement result for GNSS systems provided by the baseband processing unit 120.

Step 302: Read the temperature value T which is detected by the thermal sensor 150.

Step 304: Use the pre-determined ICB calibration table 132 to calibrate the inter-channel biases.

In step 300, the ICB calibration unit 130 receives the measurement result for GNSS systems (i.e. GPS, GLONASS, GALILEO and COMPASS) provided by the baseband processing unit 120. In step 302, the ICB calibration unit 130 reads the temperature value T, which is detected by the thermal sensor 150. In step 304, the ICB calibration unit 130 uses the pre-determined ICB calibration table 132 to calibrate the inter-channel biases. In detail, the ICB calibration unit 130 uses the current temperature to query the pre-determined ICB calibration table 132 for obtaining pre-determined inter-channel biases ICB_DET corresponding to the temperature value T, so as to calibrate the inter-channel biases which are introduced due to group delay variations for the GNSS RF signals RF_SIG. The group delays in the GNSS receiver 10 are composed of analog front-end group delays and digital front-end group delays. More clearly, processing in the analog front-end circuit 1100 leads to the analog front-end group delays, and processing in the digital front-end circuit 1120 leads to the digital front-end group delays. With appropriate design of the wideband complex band-pass filter 1106, the analog front-end group delays are almost the same among all frequency bands of the received GNSS RF signals RF_SIG (i.e. the analog front-end group delays have small variation which can be neglected), while the digital front-end group delays vary due to narrowband filtering, causing large inter-channel biases. However, the delays for each digital front-end circuit are deterministic. As long as the narrowband complex low-pass filters 1124*a*/1124*b*/1124*c*/1124*d* are fixed, pre-determined inter-channel biases corresponding to various temperature values can be used to calibrate inter-channel biases in the GNSS receiver 10.

The pre-determined ICB calibration table in the present invention can be determined by several methods. First, the pre-determined ICB calibration table is determined according to theoretical or simulated inter-channel biases. In the development stage of an integrated circuit, the RF front-end processing unit 110 and the baseband processing unit 120 have their own simulated information with GNSS band group delays and processing delays for all types of GNSS bands (i.e. GPS, GLONASS, GALILEO and COMPASS). The simulated information is composed of digital and analog parts. The simulated error for the digital part can be neglected because the simulated result for the digital part is identical to the measurement result of the integrated circuit. For the analog part, as long as the bandwidth of the wideband complex BPF 1106 is wide enough, the group delay variations for all GNSS bands are small enough to be neglected. Based on the above reasons, the theoretical or simulated inter-channel biases can be used for determining the ICB calibration table. Preferably, the pre-determined ICB calibration table is determined across temperature range of interest.

Second, the pre-determined ICB calibration table is determined according to GNSS RF-signal receiving simulation, for example, by a GNSS simulator. The ideal transmission time of simulated GNSS RF signals, which is generated by the GNSS simulator, can be obtained by the GNSS simulator, and the measured transmission time can be calculated by the GNSS receiver, so that pre-determined inter-channel biases can be obtained by comparing the measured transmission time with the ideal transmission time, and the pre-determined ICB calibration table 132 can be determined accordingly.

Figure 4:
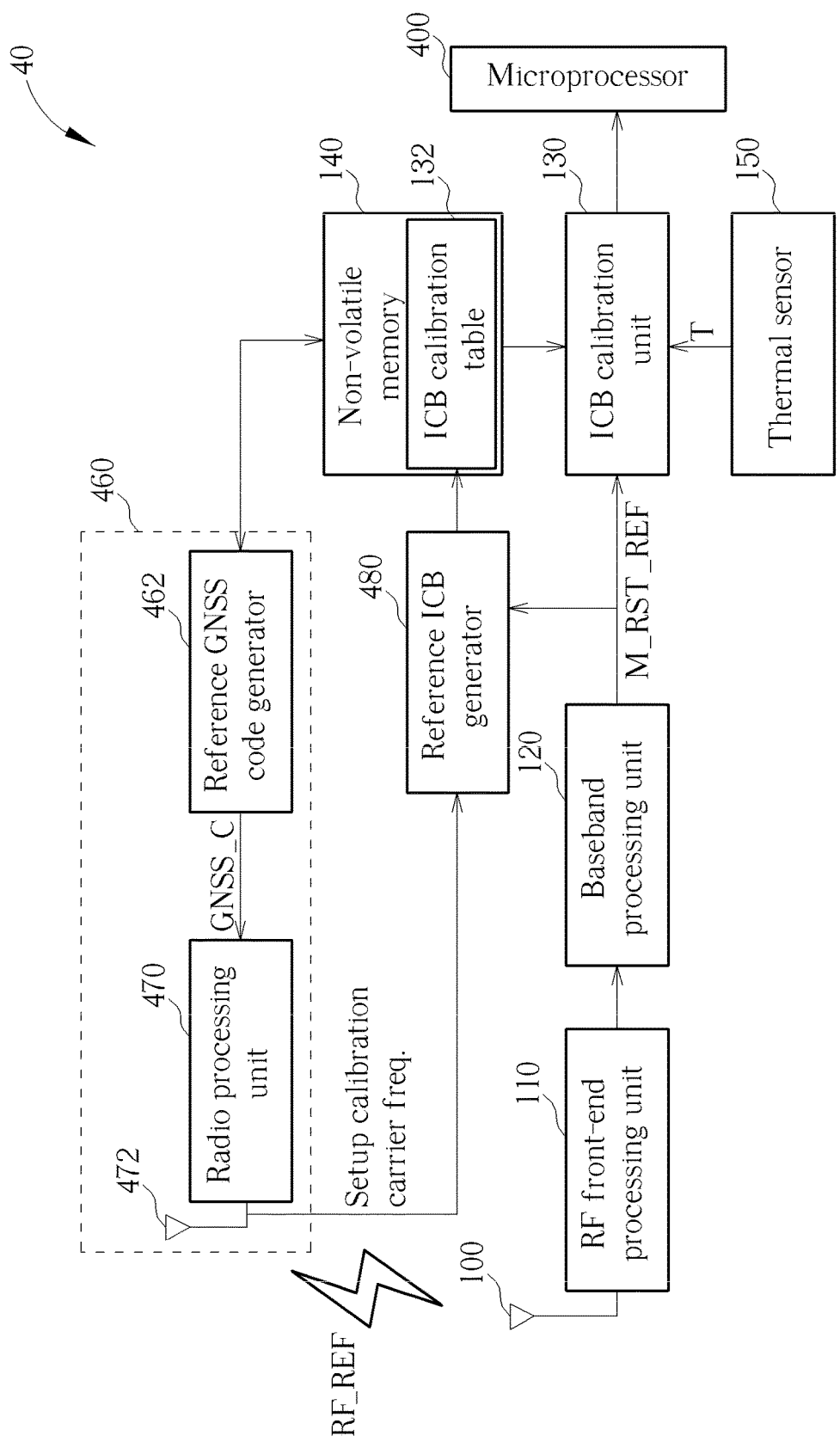
FIG. 4 is a schematic diagram of an exemplary GNSS receiver according to an embodiment of the present invention.

Third, the pre-determined ICB calibration table is determined according to estimation of reference signal group delays. Please refer to FIG. 4, which is a schematic diagram of a GNSS receiver 40 according to an embodiment of the present invention. Like the GNSS receiver 10, the GNSS receiver 40 also includes the GNSS antenna 100, the RF front-end processing unit 110, the baseband processing unit 120, the ICB calibration unit 130, the non-volatile memory 140 and the thermal sensor 150. In addition, the GNSS receiver 40 includes a microprocessor 400, a reference GNSS RF-signal generator 460 and a pre-determined ICB generator 480. The reference GNSS RF-signal generator 460 includes a reference GNSS code generator 462, an RF processing unit 470 and an antenna 472. The reference GNSS code generator 462 is utilized for generating reference GNSS codes GNSS_C (e.g. GPS, GLONASS, GALILEO or COMPASS codes). Information for generating the reference GNSS codes GNSS_C may be set in advance and/or stored in the non-volatile memory 140. Note that, in one embodiment of the present invention, the reference GNSS code generator 462 may be shared with the local GPS, GLONASS, Galileo and COMPASS code generators (not shown in FIG. 4) in the GNSS receiver 40. The RF processing unit 470, which is coupled to the reference GNSS code generator 462, is utilized for generating reference GNSS RF signals RF_REF according to the reference GNSS codes GNSS_C. The RF processing unit 470 may use front-end circuitries of one RF transmitter for various wireless systems, such as digital-to-analog converter (DAC), mixer, synthesizer and etc. Example of the RF processing unit 470 may share said circuitries with an FM transmitter, which can modulate the specific calibrating carriers controlled by the microprocessor 400 with reference GNSS codes GNSS_C to reference RF GNSS signals RF_REF. Alternatively, the RF processing unit 470 may also share said circuitries with a WiFi transmitter, Bluetooth transmitter, UMTS transmitter, etc. The antenna 472, which is coupled to the RF processing unit 470, is capable of emitting the reference GNSS RF signals RF_REF out for the GNSS antenna 100 to receive. A reference measurement result M_RST_REF is generated according to the received reference GNSS RF signals RF_REF through the RF front-end processing unit 110 and the baseband processing unit 120. The reference ICB generator 480 compares the difference in the transmission latency between the reference measurement result M_RST_REF and the reference GNSS RF signals RF_REF. Then, the pre-determined inter-channel biases are obtained accordingly, such that the pre-determined ICB calibration table 132 is determined.

In operation of the GNSS receiver 40, the GNSS receiver 40 first enables the reference GNSS RF signals generator 460 to start a reference GNSS RF signals generating process. The reference GNSS code generator 462, which is under control by the microprocessor 400, reads the information stored in the non-volatile memory 140, and generates the reference GNSS codes GNSS_C accordingly. The RF processing unit 470 receives the reference GNSS codes GNSS_C, and modulates the reference GNSS codes GNSS_C to the reference GNSS RF signals RF_REF, according to the functionality of the RF processing unit 470 (e.g. WiFi/Bluetooth/FM). The reference GNSS RF signals RF_REF are emitted by the antenna 472 and then received by the GNSS antenna 100. Note that, since the transmission time via the air is a common latency for the reference GNSS RF signals RF_REF, it does not cause difficulty to the calculation of the inter-channel bias. The reference GNSS RF signals RF_REF are converted into the reference measurement result M_RST_REF through the RF front-end processing unit 110 and the baseband processing unit 120. The pre-determined ICB generator 480 compares the difference in transmission latency between the reference measurement result M_RST_REF and the reference GNSS RF signals RF_REF, such that the pre-determined inter-channel biases are obtained, and the pre-determined ICB calibration 132 table is determined accordingly.

Note that, in the GNSS receiver 40, the reference GNSS RF-signal generator 460 operates with the same clock as the RF front-end processing unit 110 and the baseband processing unit 120, to avoid the clock drift between the reference GNSS RF-signal generator 460, the RF front-end processing unit 110 and the baseband processing unit 120, which may contribute to ICB estimation error, and the RF processing unit 470 has small variations in group delay across the frequency band of interest, such that ICB estimation error is avoided.

Fourth, the pre-determined ICB calibration table 132 is obtained by configuring one digital front-end circuit of the RF front-end processing unit 110 as a calibration channel and comparing the transmission latencies of GNSS signals through the calibration channel and the normal channel (i.e. GNSS digital front-end circuit that is not utilized as the calibration channel). In the present invention, the GPS digital front-end circuit 1120*a*, the GLONASS digital front-end circuit 1120b, the GALILEO digital front-end circuit 1120c or the COMPASS digital front-end circuit 1120d may be utilized as a calibration channel. GNSS signals which need to be calibrated are to pass the calibration channel. An example of the present invention is to utilize the GPS digital front-end circuit 1120a as a calibration channel, and pass GLONASS signals which are to be calibrated through the GPS digital front-end circuit 1120a. The GPS local oscillator 1126a of the GPS digital front-end circuit 1120a is adjusted with one fixed IF (or zero IF) for all bands of GLONASS signals, such that the group delays of all bands of GLONASS signals are the same. On the contrary, after passing the normal channel, the group delays of all bands of GLONASS signals are different. Therefore, the inter-channel biases of the GLONASS signals can be obtained by comparing the difference in transmission latencies between the GLONASS signals through the calibration channel and the GLONASS signals through the normal channel, and the per-determined ICB calibration table for the GLONASS signals is determined according to the obtained inter-channel biases.

To sum up, according to the aforementioned embodiments, the GNSS receiver provided in the present invention can immediately calibrate inter-channel biases, because the pre-determined ICB calibration table can be set in advance. At least another benefit of the GNSS receiver of the present invention is that inter-channel biases can be calibrated without adding any circuit as a calibration channel, such that system complexity is reduced and manufacturing cost is saved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of inter-channel bias (ICB) calibration in a global navigation system (GNSS) receiver, the method comprising:
   receiving a first GNSS radio frequency (RF) signal having a first frequency and a second GNSS RF signal having a second frequency;
   converting the first and second GNSS RF signals into a plurality of digital GNSS intermediate frequency (IF) signals utilizing an analog front-end circuit and converting the plurality of digital GNSS IF signals into a plurality of GNSS baseband signals utilizing at least one digital filter; and
   compensating for a group delay difference between the first and the second GNSS RF signals introduced by the at least one digital filter by utilizing a plurality of pre-determined inter-channel biases.

2. The method of claim 1, wherein converting the first and second GNSS RF signals into a plurality of digital GNSS IF signals utilizing an analog front-end circuit comprises:
   amplifying the first and second GNSS RF signals utilizing a low-noise amplifier; converting the first and second GNSS RF signals into a plurality of analog GNSS IF signals utilizing a first frequency-down converter; filtering the plurality of analog GNSS IF signals utilizing a wideband complex band-pass filter; and
   converting the plurality of analog GNSS IF signals into the plurality of digital GNSS IF signals utilizing an analog-to-digital signal converter.

3. The method of claim 1, wherein converting the plurality of digital GNSS IF signals into the plurality of GNSS baseband signals utilizing a digital front-end circuit comprises:
   converting the plurality of digital GNSS IF signals into the plurality of GNSS baseband signals utilizing a plurality of second frequency-down converters; and
   filtering the plurality of GNSS baseband signals utilizing the least one digital filter.

4. The method of claim 1, wherein the plurality of pre-determined inter-channel biases is obtained according to a plurality of theoretical or simulated inter-channel biases.

5. The method of claim 1, wherein the plurality of pre-determined inter-channel biases is obtained according to a result from at least a GNSS RF-signal receiving simulation.

6. The method of claim 1, wherein the plurality of pre-determined inter-channel biases is obtained according to the following steps:
   generating a plurality of reference GNSS codes utilizing a reference GNSS code generator;
   generating a plurality of reference GNSS RF signals utilizing a radio processing unit according to the plurality of reference GNSS codes;
   emitting the plurality of reference GNSS RF signals;
   receiving the plurality of reference GNSS RF signals via air transmission;
   generating a reference measurement result via an RF front-end processing unit and a baseband processing unit according to the plurality of reference GNSS RF signals; and
   comparing a difference in transmission latencies between the reference measurement result and the reference GNSS RF signals utilizing a pre-determined ICB generator.

7. The method of claim 1, wherein the plurality of pre-determined inter-channel biases is obtained by configuring a calibration channel from an RF front-end processing unit and comparing a difference in transmission latencies between the first and second GNSS RF signals through the calibration channel and the first and second GNSS RF signals through a normal channel of the RF front-end processing unit.

8. The method of claim 1, wherein the plurality of pre-determined inter-channel biases corresponds to at least a temperature value.

9. The method of claim 8, wherein the at least a temperature value is obtained utilizing a thermal sensor.

10. The method of claim 1, wherein the plurality of pre-determined inter-channel biases is stored in a pre-determined ICB table, wherein the pre-determined ICB calibration table is stored in a non-volatile memory.

11. The method of claim 1, wherein the first and second GNSS RF signals are a plurality of global positioning system (GPS) RF signals.

12. The method of claim 1, wherein the first and second GNSS RF signals are a plurality of European satellite navigation system (GALILEO) RF signals.

13. The method of claim 1, wherein the first and second GNSS RF signals are a plurality of Global Orbiting Navigation Satellite System (GLONASS) RF signals.

14. The method of claim 1, wherein the first and second GNSS RF signals are a plurality of Beidou navigation satellite system (COMPASS) RF signals.

15. A global navigation satellite system (GNSS) receiver comprising:

a GNSS antenna, for receiving a plurality of GNSS RF signals;

an RF front-end processing unit, coupled to the GNSS antenna, comprising:

an analog front-end circuit for converting the plurality of GNSS RF signals into a plurality of digital GNSS intermediate frequency (IF) signals; and a digital front-end circuit, coupled to the analog front-end circuit, for converting the plurality of digital GNSS IF signals into a plurality of GNSS baseband signals, the digital front-end circuit comprising at least one digital filter; and an inter-channel bias (ICB) calibration unit, coupled to the at least one digital filter, for compensating for a group delay difference, introduced by the at least one digital filter, between a first GNSS RF signal of the plurality of GNSS RF signals and a second GNSS RF signal of the plurality of GNSS RF signals utilizing a plurality of pre-determined inter-channel biases, wherein the first GNSS RF signal has a first frequency and the second GNSS RF signal has a second frequency different from the first frequency.

16. The GNSS receiver of claim 15, wherein the analog front-end circuit comprises:

a low-noise amplifier, for amplifying the plurality of GNSS RF signals;

a first frequency-down converter, coupled to the low-noise amplifier, for converting the plurality of GNSS RF signals into a plurality of analog GNSS IF signals;

a wideband complex band-pass filter, coupled to the first frequency down-converter, for filtering the plurality of analog GNSS IF signals; and an analog-to-digital signal converter, coupled to the wideband complex band-pass filter, for converting the plurality of analog GNSS IF signals into the plurality of digital GNSS IF signal-s.

17. The GNSS receiver of claim 15, wherein the digital front-end circuit comprises:

a plurality of second frequency-down converters, for converting the plurality of digital GNSS IF signals into the plurality of GNSS baseband signals; and the at least one digital filter, coupled to one of the plurality of second frequency-down converters, for filtering the plurality of GNSS baseband signals.

18. The GNSS receiver of claim 15, wherein the plurality of pre-determined inter-channel biases is obtained according to a plurality of theoretical or simulated inter-channel biases.

19. The GNSS receiver of claim 15, wherein the plurality of pre-determined inter-channel biases is obtained according to a result from at least a GNSS RF-signal receiving simulation.

20. The GNSS receiver of claim 15, further comprising:

a reference GNSS RF signals generator, comprising:

a reference GNSS code generator, for generating a plurality of reference GNSS codes;

a radio processing unit, coupled to the reference GNSS code generator, for generating a plurality of reference GNSS RF signals according to the plurality of GNSS codes; and a radio antenna, coupled to the radio processing unit, for emitting the plurality of reference GNSS RF signals; and a pre-determined ICB generator, coupled to a baseband processing unit, for comparing a difference in transmission latencies between a reference measurement result and the plurality of reference GNSS RF signals, and obtaining the plurality of pre-determined inter-channel biases accordingly;

wherein the reference measurement result is generated according to the plurality of reference GNSS RF signals received by the GNSS antenna via air transmission and converted by the RF front-end processing unit and the baseband processing unit.

21. The GNSS receiver of claim 15, wherein the plurality of pre-determined inter-channel biases is obtained by configuring a calibration channel from the RF front-end processing unit and comparing a difference in transmission latencies between the plurality of GNSS RF signals through the calibration channel and the plurality of GNSS RF signals through a normal channel of the RF front-end processing unit.

22. The GNSS receiver of claim 15, wherein the plurality of pre-determined inter-channel biases corresponds to at least a temperature value.

23. The GNSS receiver of claim 22, further comprising:

a thermal sensor, coupled to the ICB calibration unit, for obtaining the at least a temperature value.

24. The GNSS receiver of claim 15, further comprising:

a pre-determined ICB calibration table, for storing the pre-determined inter-channel biases; and a non-volatile memory, for storing the pre-determined ICB calibration table.

25. The GNSS receiver of claim 15, wherein the plurality of GNSS RF signals comprises a plurality of global positioning system (GPS) RF signals.

26. The GNSS receiver of claim 15, wherein the plurality of GNSS RF signals comprises a plurality of European satellite navigation system (GALILEO) RF signals.

27. The GNSS receiver of claim 15, wherein the plurality of GNSS RF signals comprises a plurality of Global Orbiting Navigation Satellite System (GLONASS) RF signals.

28. The GNSS receiver of claim 15, wherein the plurality of GNSS RF signals comprises a plurality of Beidou navigation satellite system (COMPASS) RF signals.

* * * * *